United States Patent Office 3,547,630
Patented Dec. 15, 1970

3,547,630
PHOTOGRAPHIC REPRODUCTION
Norman Thomas Notley, Deerfield, Ill.
(Box 462, Sierra Madre, Calif. 91024)
No Drawing. Filed Feb. 6, 1967, Ser. No. 613,995
Int. Cl. G03c 5/02, 5/04, 5/18
U.S. Cl. 96—27    5 Claims

ABSTRACT OF THE DISCLOSURE

A process for producing in the vesicular photographic film, images having relativity low Callier quotient wherein the film is first desensitized in a pattern of fine very closely spaced dots or lines either by exposure to an appropriate pattern of actinic radiation and degassing of the latent image or by mechanical abrasion such that the differencies between projection density and diffuse density of the final image is much reduced from conventional vesicular prints.

---

The present invention relates to the copying of records such as printed matter, microfilm or motion picture film, by means of compounds which produce gas upon irradiation and particularly to the making of transparent copies of photographic characteristics particularly suited to regeneration.

The art is familiar with photographic vesicular images prepared from a light sensitive layer made up from hydrophobic materials such as the polyvinylidene copolymers described in U.S. Pat. 3,032,414 or mixtures of hydrophilic polymer in a hydrophobic polymer as described in U.S. Pat. 2,703,756, wherein there is dispursed in very finely divided form a photosensitive diazo compound which liberates nitrogen gas upon photodecomposition. The image is generally developed by heat although it can be developed by light as in the author's Canadian Pat. 640,552, whereby the hydrophobic layer softens and the nitrogen gas therein expands forming minute vesicles which refract light striking the layer. While it is desired that the vesicles shall be small to permit good discrimination of the boundaries between image and nonimage, it is found that the vesicles must be at least around 0.1 micron in order to contribute useful density. This is a negative working process in which the dark areas of an original scene are reproduced as light areas and the light areas are reproduced as dark areas. Positive working processes are also known in which the latent image of the image defining exposure is deactivated usually by standing at a somewhat elevated temperature still below the softening temperature of the plastic, and an overall exposure to actinic radiation releases gas in the previously unexposed areas for development by heat or by light.

It is a characteristic of such vesicular transparencies as result from the processes described that their photographic densities depend markedly on the method of viewing and particularly on the angle of illumination or on the angle of viewing. Consequently a piece of vesicular film of uniform characteristic will produce a different response in the eye of the beholder depending on whether it is seen in a slide projector, microfilm viewer, motion picture projector or other optical device. This observation has been made with respect to other photographic films and particularly to silver films where the ratio between the density in a projection system and the density observed in a diffuse situation is known as the Callier quotient. However Callier quotients for silver film are generally less than 2.0, for diazotype film, photochromics and other imaging materials in which the density is purely absorbtive the Callier quotient is close to unity, whereas for vesicular films it ranges up to and even beyond 9.0. It is still possible to tailor a film so that it fits one mode of use with the preferred range of densities. But it is generally impossible to make a vesicular image which will be useful for two or more purposes. For instance, a continuous tone picture was copied to a positive vesicular transparency in which the record was carried by a wide range of densities up to about 2.6 as measured on the screen while being projected in a Bell and Howell f/3.5 projector. The 2.6 maximum density had been chosen after it was observed that the eye could readily distinguish density differences of .1 to .15 at lower densities but not above 2.6. The same slide was then observed in a single battery operated hand previewer. The picture was "washed out" and highly deficient in density. Another slide was prepared on a vesicular film material of higher density so that the picture seen in the pre-viewer was quite pleasing. When this second slide was seen in the Bell and Howell projector, it was now very dark with much of the shadow detail lost in densities between which the eye could not distinguish. The problem of incompatible end uses becomes most acute when, as will be demonstrated in the examples, a film made for projection viewing needs also to be copied, a process which generally finds the original film and the copy sheet in intimate contact, a relationship in which it is the diffuse density of the original which controls the process. Projection quality vesicular films are very difficult to copy because their diffuse densities are very low. It is a principal object of the present invention to make vesicular transparencies, microfilm and continuous tone pictures in which the diffuse or printing density is much higher in relation to the projected density and which consequently yield better copies in regeneration.

In the present invention the formulation is coated from solution or from emulsion and dried down, usually on a transparent flexible base material which might be a polyester, or polycarbonate. It may optionally be given sensitizing treatments, e.g. the liquid process described in U.S. Pat. 3,149,971 or the dry process described in U.S. application 121,636, now abandoned, (July 3, 1961). The particularly distinctive step in the present invention is a desensitizing process. The sensitive vesicular film is exposed through a transparency carrying a pattern of small holes in an otherwise opaque sheet held by vacuum in close contact with the sensitive emulsion and exposed to a source of substantially collimated actinic light until the emulsion is exposed right through. After the gas has diffused from the exposed areas, the film differs from its original state only to the extent that there is a pattern of desensitized points. In one embodiment the pattern for the exposure was obtained by drawing a regular two dimensional array of solid circles such that the ratio of the circle diameter to the circle separation was about 1:20 and microphotographing on a high resolution silver emulsion so that the actual diameter of the now clear circle was about one micron. It is apparent that a similar effect might be expected if the modulating pattern were a series of linear scratches or lines instead of holes. However the desired effect seems to depend on the area of transparency so for a line pattern either the lines must be narrower than the dots, which is experimentally somewhat difficult, or the separation of the lines must be greater than the separation in the dot pattern which tends to reduce the resolution obtainable with the new product. Limits on the area of coverage are dictated by the extent of the effect needed. If the area of desensitized film, as a proportion of the total film area, is less than .05% then its contribution toward reducing projection density is only just detectable. As the coverage of desensitization is increased, the projection and the diffuse densities tend to converge as desired. Eventually however there is a significant loss of diffuse density. Levels above 2% desensitization will not be desired because density cannot be developed above 1.7. In another embodiment the screen was obtained by thoroughly dispersing carbon black particles of approximate diameter one micron in a 20% solution of polyvinyl acetate in proportion such that the volume ratio of carbon black to polymer was .05% and coating from a one mil nip to have a dried down film of thickness 0.2 mil. This was first printed to high resolution silver halide film which was then used as a mask in the exposure which desensitized the vesicular film.

It will be apparent to one experienced in the general art, that an equivalent effect can be obtained by mechanically rupturing the emulsion in the required pattern or by including in the vesicular film at the time of coating an approximate concentration of transparent, highly permeable insoluble particles of for example polyethylene preferably around one micron diameter. Points at which the polyethylene spheres located formed no density which was the intended result.

The surprising result was that the film densensitized as presently taught, in highly localized spots, could be used to give an image of relatively low Callier quotient so that projection and diffuse or printing densities were much closer together and films designed for specific projection functions could be copied, either to another vesicular film or to silver halide, diazo or photochromic materials much more readily than could films of the prior art. This entirely desirable result was obtainable whether used negative-working or reversal processed for positive-working as will be described in the examples. If the desensitization process comprising exposure through a mask and diffusing of the gas is followed by reversal processing as described in Example 3 which begins with an image defining exposure followed by a diffusion of its gas, it is evident that one step can be eliminated. The desensitizing exposure is followed directly by the image defining exposure and then the diffusion step removes the gas from both exposures. Processing is completed by an overall exposure and development.

It will be apparent that a similar result can be obtained, although somewhat less conveniently, if the desensitizing is done during actual use of the film. If the film is to be given simple processing for a negative-working copy the half tone screen will be substantially clear, the negative of the one described above, and the image defining exposure will be made through the screen. If, however, the film is being reversal processed for positive working copy then there are three possible timings for the desensitization. The substantially opaque screen might be used for an actinic exposure and degassing before imaging use, which for its practical convenience will be preferred generally or the substantially opaque screen can be used for a desensitizing exposure between the image defining exposure and the degassing process or a substantially clean half-tone screen can be contacted to the sensitive film during its overall exposure.

The advantages of the present invention are not restricted to one particular vesicular formulation but are expected to be applicable to all formulations. The polymer matrix must have a relatively low permeability constant for gases which are used in the vesicular process, usually nitrogen. It must be self-supporting or adherable to a suitable support. Among those which have been found suitable are polyvinyl butyral, polyisobutylene, polyvinyl chloride and the many copolymers of vinylidene chloride taught by U.S. Pat. 3,032,414, mixtures of the above with polymethyl methacrylate, various polyamides, partially cross linked gelatin, mixtures of polyvinylalcohol or gelatin in polyvinylidene copolymers as taught in U.S. Pat. 2,703,756, acrylonitrile/ethylacrylate copolymers, polymethacrylonitrile, polyvinyl formal particularly with epoxy modifiers, polystyrene and the melamine or urea-formaldehydes as taught in U.S. Pat. No. 3,244,523.

It is possible to use a vehicle plastic which has the proper rigidity-temperature relation but is not quite satisfactory concerning diffusivity and permeability, and to correct the latter defect by adding a modifier for permeability adjustment. It is also feasible, instead of using a modifier for diffusivity adjustment to select a vehicle with correct diffusivity but unsuitable, such as low, rigidity, and to add a modifier for correcting the rigidity. Further I can select a vehicle plastic of good general physical characteristics but having a rigidity as well as diffusivity characteristics which are not quite suitable for the invention, which latter I correct by means of a modifier which adjusts diffusivity and permeability as well as rigidity. Separate rigidity and diffusivity modifiers can be used.

A vehicle can be used which has a low diffusivity as well as low rigidity and both are increased by a modifier. In another embodiment a vehicle which is comparatively hard and too permeable might be compounded with a modifier which decreases its permeability. The option of using a modifier permits a fairly wide choice among polymers for use as a vehicle.

The herein listed materials in so far as they are suitable for purposes of the present invention, must have as a basic property determining their usefulness for that purpose, a permeability constant, that is not greater than $8 \times 10^{-10}$ cm.$^{-3}$ cm.$^{-2}$ sec$^{-1}$ (cm. Hg./cm.)$^{-1}$ the number of cubic centimetres of gas transmitted by the unit area of one square centimetre during one second when the pressure gradient is one centimeter of mercury per centimeter of thickness of the vehicle layer. This condition must be satisfied by the unmodified vehicle if used as such, or by the vehicle with a modifier admixture added to a binder.

The gas which is produced upon irradiation might be carbon dioxide, carbon monoxide or oxygen but nitrogen is generally the most useful and among those sensitizing compounds which liberate nitrogen upon irradiation, paradiazo dimethylaniline zinc chloride was found to be especially valuable but the following compounds were also found to be practical:

p-Diazo diphenylamine sulfate, p-diazo diethylaniline zinc chloride, p-diazo ethyl hydroxyethylaniline zinc chloride, p-diazo ethyl methyl aniline zinc chloride, p-diazo diethyl methyl aniline zinc chloride, p-diazo ethyl hydroxyethylaniline zinc chloride, 1 diazo-2 oxy naphthaline-4-sulfonate, 4-benzoylamino - 2 - 5 - diethoxy benzene diazonium chloride, p-chlorobenzene-sulfonate of 4-diazo-1-cyclohexylaniline, p-chlorobenzene-sulfonate of 4-diazo-2-methoxy-1-cyclohexylamino benzene, tin chloride double salt of 4-N-methylcyclohexylamino- benzene diazonium chloride, p-acetamino benzene diazonium chloride, 4-dimethylamino benzene diazonium chloride, 3-methyl-4-diethyl amino benzene diazonium chloride, 4-morpholino benzene diazonium chloride, 4-piperidyl 2-5 diethoxy benzene diazonium chloride, 1-dimethyl amino naphthaline-4-diazonium chloride, 4-phenyl amino diazo benzene diazonium chloride. Also useful are such thiazine diazonium derivatives as 7-dimethylamino-3-oxo-dihydro-1,4-thiazine-6-diazonium chloride;
6-dimethylamino-3-oxo-dihydro-1,4-thiazine-6-diazonium chloride;
6-dimethylamino-3-oxo-dihydro-1,4-oxazine-6-diazonium chloride;
7-dimethylamino-8-methoxy-3-oxo-dihydro-1,4-thiazine-6-diazonium chloride;
6-dimethylamino-2-methyl-3-oxo-dihydro-1,4-thiazine-6-diazonium chloride.

and various stabilized complex metal salts of the above compounds.

All materials which are herein or heretofore demonstrated as suitable for making vesicular record have the defect which has been described as high Callier quotient, quite independently of vesicular size or material parameters. The present invention can be applied to all these materials and the effect it essentially equivalent, the reduction in Callier factor depending only on the type of desentitizing exposure which is selected. The following examples will illustrate variations on the desensitization and relate them to the surprising results. The invention however is not limited to these examples:

EXAMPLE 1

1.2 grams of p-diazodimethylaniline zinc chloride was dissolved in 12 grams of acetonitrile and subsequently mixed with a solution compounded from 17.0 grams of a vinylidene chloride/acrylonitrile copolymer sold as Saran F–120 (200 cps.) by Dow Chemical, 1.2 grams of polymethylmethacrylate and 60.0 grams of methylethylketone. This was coated on Mylar polyester to a dry thickness of 0.7 mil. After thorough drying, it was presensitized by immersion in boiling water for 30 seconds. Half of the sample was retained as now prepared and used as the experimental control while the other half was treated to a desensitizing exposure as described following.

A pattern of dots was drawn on highly reflective paper such that the separation of dots was exactly .53 millimetre on each rectangular coordinate and their diameter as closely as possible .001 inch. This pattern was photographed with a 30 times reduction to high resolution silver halide film. From subsequent measurement on the silver film it was confirmed that the holes, now visible only in a microscope, were about 0.16% of the total area. This screen was contacted emulsion to emulsion with the vesicular film and exposed to a 400 watt ultra-violet source at 10 inches distance for 20 seconds. The film was left overnight, and the latent image judged to have diffused away. Both the control film and the selectively desensitized film were given equivalent actinic exposures through a continuous carbon wedge and developed by heating on a hot roll for ½ sec. at 250° F. Diffuse densities and projection densities at an aperture of $f/3.5$ were measured on a converted McBeth transmission densitometer at convenient and equivalent positions along the two wedges.

| Control film densities | | Desensitized film densities | |
|---|---|---|---|
| Diffuse | $f/3.5$ | Diffuse | $f/3.5$ |
| low | 1.0 | low | 0.95 |
| low | 1.6 | low | 1.58 |
| .2 | 2.0 | .2 | 1.94 |
| .8 | 2.6 | .8 | 2.39 |
| 1.0 | 2.8 | 1.0 | 2.50 |
| 1.2 | 3.0 | 1.19 | 2.59 |
| 1.4 | 3.2 | 1.38 | 2.65 |

| Control film (nett density) | | Desensitized film (nett density) | |
|---|---|---|---|
| Diffuse | $f/3.5$ | Diffuse | $f/3.5$ |
| .1 | 1.0 | 0.1 | .95 |
| .2 | 1.6 | 0.2 | 1.46 |
| 0.3 | 1.9 | 0.3 | 1.64 |
| .4 | 2.0 | 0.4 | 1.70 |
| 1.0 | 2.6 | 1.0 | 1.9 |
| 1.2 | 2.8 | 1.2 | 1.94 |

It is seen that a conventional vesicular film matching the diazotype film in projection density of 1.9 has a diffuse density of only 0.3 and is essentially impossible to copy faithfully whereas the film of the present invention has a density of 1.0 and is much more compatible with the diazotype.

EXAMPLE 2

The same films of Example 1 were handled in exactly the same way except that after the contact exposure to the continuous carbon wedge, the films were placed in an oven at 150 Fahrenheit for one hour and then re-exposed overall to ultra violet before development for ½ second at 250 F. The wedge was now a direct copy of the carbon wedge, positive working instead of negative working, but the basic density relationships of Table 1 were reproduced unchanged. With both film strips projected on a screen with the Bell and Howell slide projector the eye was unable to distinguish further variation beyond projection densities of 2.6. It is readily apparent from the table of values that the observable "message" was carried in the control film by a diffuse density range of 0.8 whereas with the film of the present invention the message was spread over a diffuse density range of 1.2. Anyone familiar with film printing will appreciate that it is relatively difficult to reproduce a film with a density range as short as 0.8 and is very much easier with the range extended to 1.2.

EXAMPLE 3

The problem of handling vesicular film is very much more severe in a systems application where for example it is being used interchangeably with diazo film. The characteristics of diazotype film are such that the maximum density in projection viewing might be 1.9 and the diffuse density would also be 1.9. Such a film is very easy to regenerate without loss of density or of information.

In the present example the test was to view in a Graphlex $f/3.0$ slide projector, although measurements were actually made in the converted McBeth densitometer for greater accuracy. The screen used in the desensitizing exposure had somewhat larger holes and in fact amounted to 0.32% of the total area.

EXAMPLE 4

1.2 grams of p-diazodimethylaniline zinc chloride was dissolved in 12 grams of acetonitrile and subsequently mixed with a solution compounded from 17.0 grams of a vinylidene chloride/acrylonitrile copolymer sold as Saran F–120 (200 cps.) by Dow Chemical, 1.2 grams of polymethylmethacrylate and 60.0 grams of methylethylketone. .039 gram of polyethylene spheres of approximate diameter 2 microns were added with vigorous stirring to make a suspension which was coated on Mylar polyester to a dry thickness of 0.2 mil. After thorough drying, it was presensitized by immersion in boiling water for 30 seconds. A step wedge was printed on the transparency by exposure to ultra-violet and heating to 250 F. for ½ second. The relation between projection density and diffuse density showed a very low Callier quotient, essentially as with the desensitized strip of Example 2.

It should be understood that the present disclosure is for the purpose of illustration only and that this invention includes all modifications and equivalents which fall within the scope of the appended claims.

I claim:

1. In the process of forming a record in a film solely in the form of a distribution pattern of radiation scattering discontinuities formed within an otherwise substantially homogeneous vehicle comprising an at least temporarily softenable normally hard and firm film forming water-insoluble polymer having a permeability constant for nitrogen less than $8 \times 10^{-10}$ cm.$^3$ cm.$^{-2}$ sec.$^{-1}$ (cm. Hg/cm.)$^{-1}$ and a light decomposable solid agent substantially uniformly dispersed therein as the sole essential image producing agent, said decomposable agent itself being non-reactive to said vehicle and upon exposure to light decomposing into products which are also chemically non-reactive to said vehicle and which solely upon warming are volatile to form said radiation scattering discontinuities only in the light struck areas, the steps comprising:

(a) an overall exposure to actinic radiation of said film through an otherwise opaque screen having a pattern of small transparent areas uniformly distributed and not separated by more than about .001 inch and having a total area between .05% and 2% of the screen area, (b) holding the film below its softening point until the gas formed in the first exposure has substantially escaped from the film, (c) giving the film an image defining exposure and heating above the softening point to expand the volatile products to cavities having a diameter not less than 0.1 micron such that a vesicular image is formed in the exposed areas of the said film.

2. In the process of forming a record in a film solely in the form of a distribution pattern of radiation scattering discontinuities formed within an otherwise substantially homogeneous vehicle comprising an at least temporarily softenable normally hard and firm film forming water-insoluble polymer having a permeability constant for nitrogen less than $8 \times 10^{-10}$ cm.$^3$ cm.$^{-2}$ sec.$^{-1}$ (cm. Hg./cm.)$^{-1}$ and a light decomposable solid agent substantially uniformly dispersed therein as the sole essential image producing agent, said decomposable agent itself being non-reactive to said vehicle and upon exposure to light decomposing into products which are also chemically non-reactive to said vehicle and which solely upon warming are volatile to form said radiation scattering discontinuities only in the light struck areas, the steps comprising:

(a) an overall exposure to actinic radiation of said film through an otherwise opaque screen having a pattern of small transparent areas uniformly distributed and not separated by more than about .001 inch and having a total area between .05% and 2% of the screen area, (b) holding the film below its softening point until the gas formed in the first exposure has substantially escaped from the film, (c) giving the film an image defining exposure and holding the film below its softening point until the gas formed in the image defining exposure has substantially escaped from the film, (d) giving the film an overall exposure to actinic radiation and heating above the softening point of the film to expand the volatile products to cavities having a diameter not less than 0.1 micron such that a vesicular image is formed in the unexposed areas of the image defining exposure in the said film.

3. The process of claim 2 wherein steps b and c are accomplished concurrently.

4. A process of forming a record in a film solely in the form of a distribution pattern of radiation scattering discontinuities within the vehicle of claim 1 wherein the density forming exposure is modulated by an otherwise transparent screen having a pattern of small essentially opaque areas uniformly distributed and not separated by more than about .001 inch and having a total area between .05% and 2% of the screen area before heating above the softening point to expand the volatile products to cavities having a diameter not less than 0.1 micron, the steps comprising:

(a) giving the film image defining exposure through the said screen, in that (b) developing by heating to expand the volatile products to cavities having a diameter not less than 0.1 micron such that a vesicular image is formed in the said film.

5. In the process of forming a record in a film solely in the form of a distribution pattern of radiation scattering discontinuities formed within an otherwise substantially homogeneous vehicle comprising an at least temporarily softenable normally hard and firm film forming water-insoluble polymer having a permeability constant for nitrogen less than $8 \times 10^{-10}$ cm.$^3$ cm.$^{-2}$ sec.$^{-1}$ (cm. Hg./cm.)$^{-1}$ and a light decomposable solid agent substantially uniformly dispersed therein as the sole essential image producing agent, said decomposable agent itself being non-reactive to said vehicle and upon exposure to decomposing into products which are also chemically non-reactive to said vehicle and which solely upon warming are volatile to form said radiation scattering discontinuities only in the light struck areas, the steps comprising:

(a) desensitizing said film by mechanical contact with an abrasive screen in a pattern of small areas uniformly distributed and not separated by more than about .001 inch, said small areas having a combined area between .05% and 2% of the total area, (b) giving the film an image defining exposure and, (c) developing by heating to expand the volatile products to cavities having a diameter not less than 0.1 micron such that a vesicular image is formed in the said film.

References Cited
UNITED STATES PATENTS

| | | | |
|---|---|---|---|
| 2,908,572 | 10/1959 | Schoen et al. | 96—75X |
| 2,925,338 | 2/1960 | Schadlich | 96—6 |
| 3,032,414 | 5/1962 | James et al. | 96—75X |
| 3,122,436 | 2/1964 | Wattier | 96—45 |
| 3,218,163 | 11/1965 | Acton et al. | 96—49X |
| 3,269,835 | 8/1966 | Flint | 96—27X |
| 3,298,833 | 1/1967 | Gaynor | 96—27 |
| 3,355,295 | 11/1967 | Priest | 96—49X |

OTHER REFERENCES

Dorst, P., "A Method of Designing and Making Contact Screens," 1951, p. 26 relied on.

"The Focal Encyclopedia of Photography," vol. I, 1965, p. 133–134 relied on.

Gearhart, R., The Photoengravers Bulletin, Nov. 1964, pp. 93–99 relied on.

Nieset R., J. of Photo Science, vol. 10, 1962, pp. 188–195 relied on.

Notley N., Photo Sci. & Eng., vol. 10, no. 1, Jan, 1966, pp. 3–7 relied on.

NORMAN G. TORCHIN, Primary Examiner

C. L. BOWERS, JR., Assistant Examiner

U.S. Cl. X.R.

96—44, 45, 45.2, 91, 119